United States Patent [19]

Poklemba

[11] Patent Number: 4,849,998
[45] Date of Patent: Jul. 18, 1989

[54] RATE SYNCHRONIZED SYMBOL TIMING RECOVERY FOR VARIABLE RATE DATA TRANSMISSION SYSTEMS

[75] Inventor: John J. Poklemba, Ijamsville, Md.

[73] Assignee: Communications Satellite Corporation, Washington, D.C.

[21] Appl. No.: 201,986

[22] Filed: Jun. 3, 1988

[51] Int. Cl.$^4$ ............................................. H04L 23/00
[52] U.S. Cl. ..................................... 375/121; 375/97; 375/120
[58] Field of Search ............... 375/106, 120, 121, 119, 375/97, 94.95; 370/84; 331/1 A, 1 R

[56] References Cited

U.S. PATENT DOCUMENTS

| | | | |
|---|---|---|---|
| 3,959,601 | 5/1976 | Olevsky et al. | 375/120 |
| 4,419,759 | 12/1983 | Poklemba | 375/97 |
| 4,611,226 | 9/1986 | Machida et al. | 375/106 |
| 4,691,327 | 9/1987 | Wenger | 331/1 A |
| 4,748,644 | 5/1988 | Silver et al. | 375/121 |
| 4,757,279 | 7/1988 | Balzano | 375/120 |
| 4,759,079 | 7/1988 | Ichikawa | 375/120 |

Primary Examiner—Benedict V. Safourek
Assistant Examiner—Stephen Chin
Attorney, Agent, or Firm—Sughrue, Mion, Zinn, Macpeak & Seas

[57] ABSTRACT

A symbol timing recovery circuit with a clock synchronization loop for variable rate data signals utilizes a frequency synthesizer for setting the frequency of the recovered clock signal. The received data signal, representing the modulating waveform of a transmitted modulated waveform, is estimated by passage through a data filter and sampling comparator sampled by the recovered clock. The received data signal is also delayed and multiplied by the time derivative of the estimated data signal to produce an error signal representing the difference between the incoming data rate and the output of a narrow pull range voltage controlled oscillator, VCO. The error signal is input to the VCO to correct the VCO output. A programmable frequency synthesizer provides timing signals having a range of the symbol rate divided by n. The VCO output is mixed with the frequency synthesizer output and the sum signals removed by a low pass signal to produce the difference signals which will correspond to the clock signal of the data signal.

7 Claims, 3 Drawing Sheets

RATE SYNCHRONIZED SYMBOL TIMING RECOVERY FOR VARIABLE RATE DATA TRANSMISSION SYSTEMS

BACKGROUND OF THE INVENTION

1. Field of the Invention

The invention is in the field of data transmission systems and particularly in the field of symbol timing (clock) recovery techniques for data transmission systems.

2. Background Art

In conventional data transmission systems information may be transmitted in the form of modulated waveforms. In order to retrieve the transmitted information at a receiver it is necessary to demodulate the received transmission. The demodulation process requires that a carrier reference signal and a clock signal synchronized to the symbol timing of the received modulated information be derived. It is conventional to provide symbol timing recovery circuits at the receiver to recover symbol timing from the received signal and produce a clock synchronized to the symbol timing of the modulated information. A typical symbol timing recovery circuit for producing a clock synchronized to the symbol timing of the modulated waveform is disclosed in U.S. Pat. No. 4,419,759, which issued on Dec. 6, 1983 to John J. Poklemba, as part of circuitry for achieving concurrent synchronization of carrier phase and clock timing in double-sideband, suppressed carrier transmission systems.

The symbol timing recovery circuit of the referenced Poklemba patent is illustrated in FIG. 1 herein. This figure corresponds to the symbol timing recovery portion of the Poklemba patent FIG. 6. A full discussion of the FIG. 1 circuitry is found in the Poklemba patent. Two clock synchronization loops for symbol timing recovery are illustrated. These loops perform parallel, coherently aiding operations on the a and b channels. The operations performed by the channels are combined to produce a composite error signal, which typically has a better signal-to-noise ratio than either of the individual channels. A first clock synchronization loop is responsive to the baseband waveform, $a_i(t)$, derived from the input signal $r(t)$ through the mixer 102. A second clock synchronization loop is responsive to the baseband waveform, $b_i(t)$, derived from the modulated input, $r(t)$ through the mixer 104.

The first clock synchronization loop includes data filter 110 and delay 150 each receiving the baseband data waveform, $a_i(t)$. The output of the data filter 110 is applied to comparator 114 which is sampled by the recovered synchronized clock R to produce a replica, Â, of the data waveform $a_i(t)$. During clock recovery, the output of the delay 150 is applied to the mixer 200. The mixer multiplies the baseband data signal with the time derivative of the analog bit stream â supplied from the differentiation circuit 202. The analog bit stream â is effectively the analog data estimate of the modulating waveform $a_i(t)$. The output from the mixer 200 is an error signal which is proportional to the difference between the output from VCO 118 and the incoming data rate. After summing the a and b error signals in adder 207, the resultant is applied to loop filter 208 which is connected to the VCO 118 to synchronize the VCO output to the incoming data rate.

The second clock synchronizing loop of FIG. 1 includes data filter 112, sampled comparator 116, data filter 122, delay 152, mixer 204 and differentiation circuit 206. The operation of the second clock synchronization loop is similar to the operation of the first clock synchronization loop. The baseband data waveform corresponding to the modulating waveform $b_i(t)$ is multiplied by the time derivative of the analog bit stream b, which is an analog data estimate of the waveform $b_i(t)$, in the mixer 204. The mixer output is applied to the loop filter 208 through the summing circuit 207, with the loop filter output being applied as a resultant error signal to the VCO 118.

The signal timing recovery circuits for clock synchronization illustrated in the above referenced Poklemba patent are implemented for operation at a fixed data rate. It is sometimes desirable to adapt a symbol timing recovery circuit to receive variable data rates. A method for variable rate symbol timing recovery is disclosed in U.S. Pat. No. 3,959,601 which issued on May 25, 1976 to Olevsky et al.

FIG. 2 is a simplified block diagram of the Olevsky variable rate clock signal recovery circuitry. Basically Olevsky provides a two stage clock recovery scheme. A first stage consists of a transition detector 12, mixer 14, bandpass filter 16, variable time delay 18, mixer 20, lowpass filter 22, and a comparator 42. A frequency synthesizer 24 is provided to translate a variable rate input signal to a common IF frequency. As explained more fully in the Olevsky patent, this first stage produces a coarse symbol rate clock estimate $R_s$. The second stage is a phase-lock loop (PLL) that tracks $R_s$ with a board pull in range voltage controlled oscillator (VCO) 28. The second stage is included so that the PLL tracking bandwidth may be made narrower than that of the bandpass filter, resulting in a better clock estimage, $R_s$. Also, when no data transitions are present and the clock component of $R_s$ is effectively zero, an output clock will be available.

A serious disadvantage of this technique is that the pull range of the VCO must be relatively large requiring the use of LC or RC resonance determining elements in the oscillator. For example, the pull range is typically greater than an octave, as described in the Olevsky patent. As a result, the output clock phase jitter performance of the PLL will be severely limited by the phase noise of such a VCO. The reason for this is that a large closed loop bandwidth is required to track out the phase noise of the local VCO. The larger the bandwidth, the greater is the output clock jitter due to incoming noise.

Applying the Olevsky divide by N method to the PLL, in the fixed data rate clock recovery circuit illustrated in FIG. 1 to produce a variable data rate clock recovery circuit results in an arrangement as illustrated in FIG. 3.

Like elements in FIGS. 1 and 3 are given common reference numerals. With reference to FIG. 3, an input signal $i(t)$, which is an analog baseband representation of an input data sequence, is applied to data filter 110 and delay 150 through an analog to digital converter 149. Of course, for variable data rate operation the filter 110 and the delay 150 must be scaled according to the selected symbol clock, $R_s$. When the input signal is analog to digital converted, and digital filtering and delay are used, the scaling will be automatic.

After the baseband input signal passes through the filter 110 and is sampled with the recovered symbol clock, $R_s$, a very good estimate of the transmitted data sequence is obtained. This data estimate, Î(t), is digitally differentiated in a differentiation circuit 202 and multiplied in mixer 200 with the delayed incoming baseband signal, I(t+T), to produce a symbol timing error signal. This error signal is applied to the loop filter 208. The loop filter is coupled to the VCO 118' to apply the error signal to the VCO.

As explained hereinbefore, the variable rate clock recovery scheme that uses a VCO with a divide by N divider to reproduce the variable symbol rates must use a VCO with a broad pull range, with its inherent disadvantages which include relatively poor stability and increased output phase jitter. For progressively lower data rates, the bit error rate of the data transmission becomes more degraded due to excess recovered clock jitter. A narrow crystal VCO has a typical pull range five hundred times narrower than that of the LC tank VCO used in the circuit of the Olevsky patent. While the crystal VCO has increased stability and improved output phase jitter compared to the LC or RC VCO, it cannot be practically used in a variable rate clock recovery circuit using a divide by N circuit as illustrated in FIG. 3 for the following reason.

Use of the crystal VCO dictates that only integer divisible clock rates are possible. For example, if the crystal VCO frequency were 10 MHz in a divide by N scheme, only clock rates in the neighborhood of 10, 5, 2.5, 1.6 MHz, etc. could be obtained. This is so because the crystal cannot be pulled far enough to lock onto frequencies between those listed. Moreover, the first two clock rates of this example reveals that an octave pull range VCO is necessary for synchronization at any k-digit rate between 5 and 10 MHz.

SUMMARY OF THE INVENTION

An object of the invention is a symbol timing recovery circuit with a clock synchronization loop for recovering the clock signal from a variable rate data signal.

A further object of the invention is such a symbol timing recovery circuit which can respond to variable rate data signals without the use of a broad pull range VCO.

These and other objects which will become apparent from the following description of the invention, are accomplished with a symbol timing recovery circuit with a clock synchronization loop which in place of the broad pull range VCO and divide by N frequency divider employs a frequency synthesizer to select the clock rate. The use of the frequency synthesizer to select the clock rate enables the use of a narrower pull range VCO with its attendant advantages.

DETAILED DESCRIPTION OF THE PREFERRED EMBODIMENT

Figure 4:
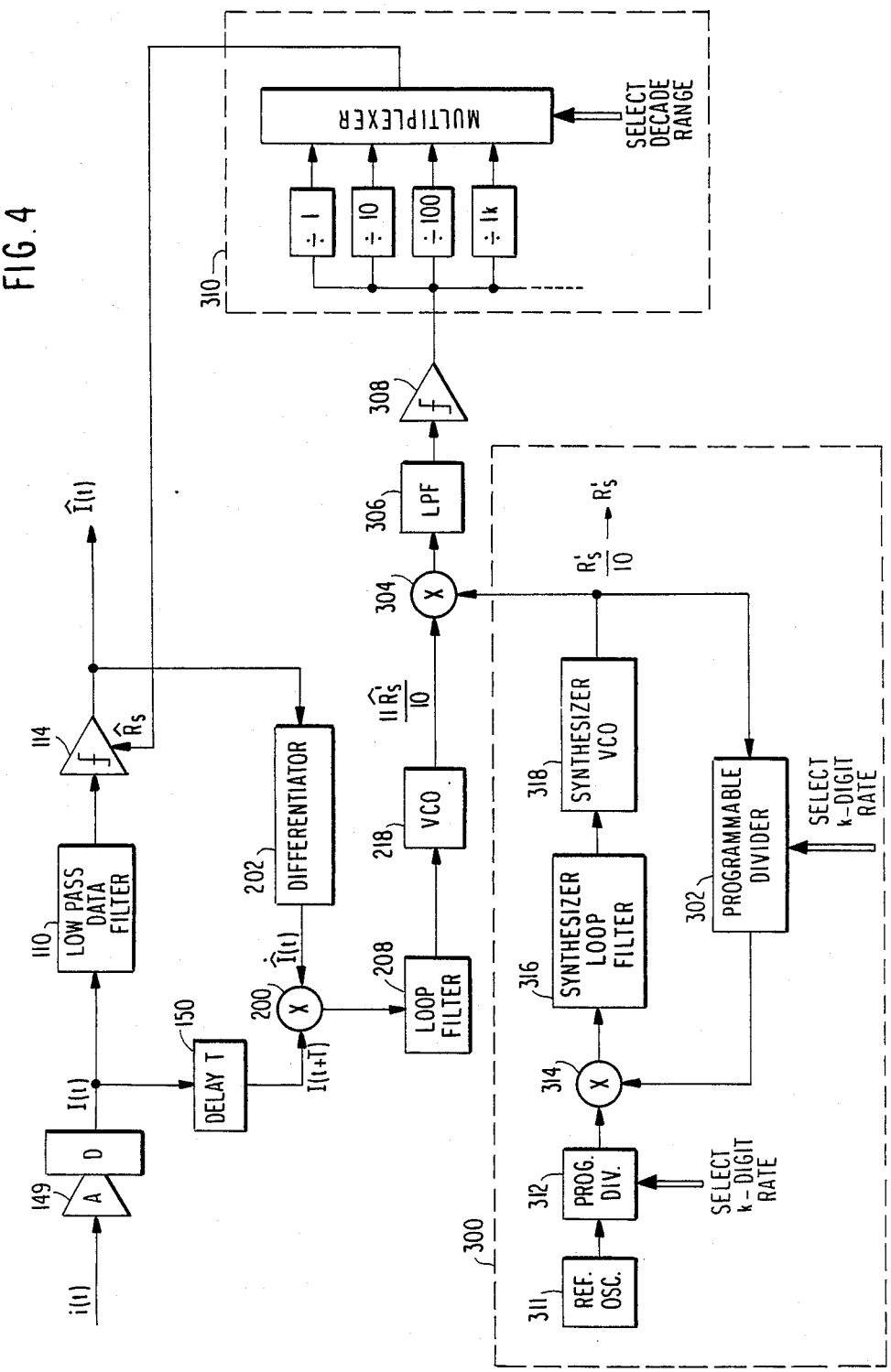
FIG. 4 is an illustration of a portion of the circuitry of FIG. 1 adapted to respond to variable rate data signals according to the teachings of the invention.

FIG. 4 illustrates a preferred embodiment of the present invention. In FIG. 4 the teachings of the invention are applied to the clock synchronization loop of the reference Poklemba patent. It is to be understood that the invention is not limited to this preferred embodiment. Rather, it is applicable generally to symbol timing recovery circuits for data transmission systems receiving variable rate data signals.

Figure 1:
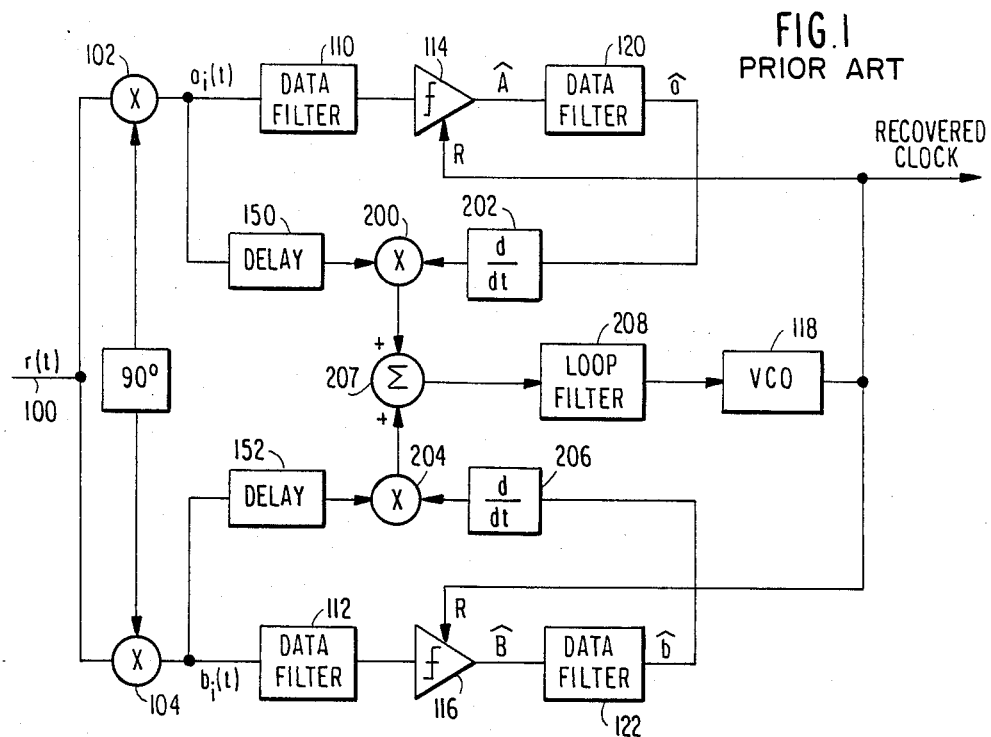
FIG. 1 illustrates an example of a conventional symbol timing recovery circuit with a clock synchronization loop responsive to a fixed data rate signal.
Figure 3:
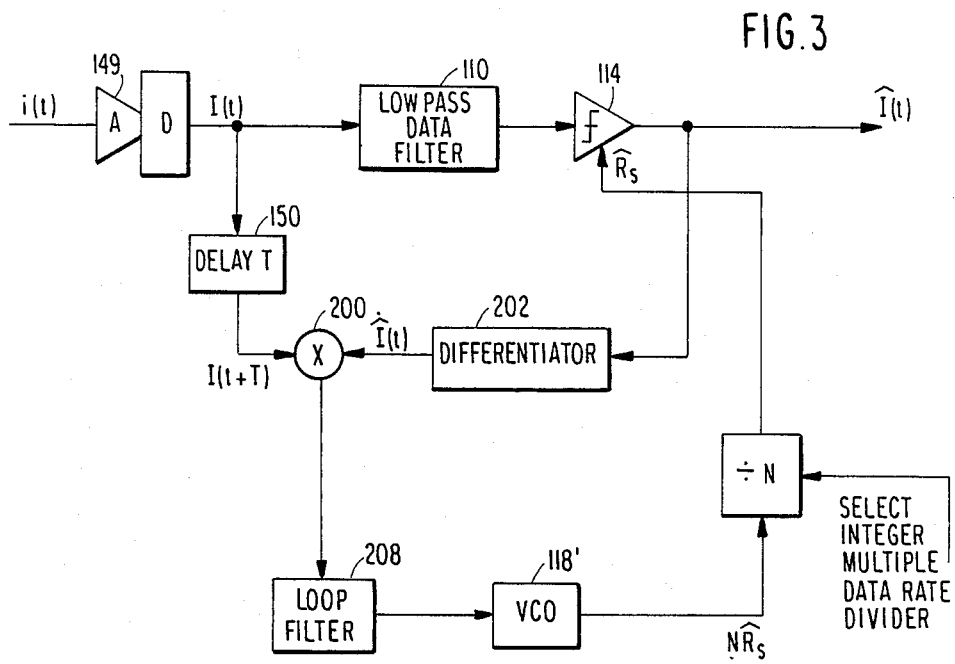
FIG. 3 is an illustration of a portion of the circuitry of FIG. 1 adapted to respond to variable data rate signals using a divide by N technique.
Figure 2:
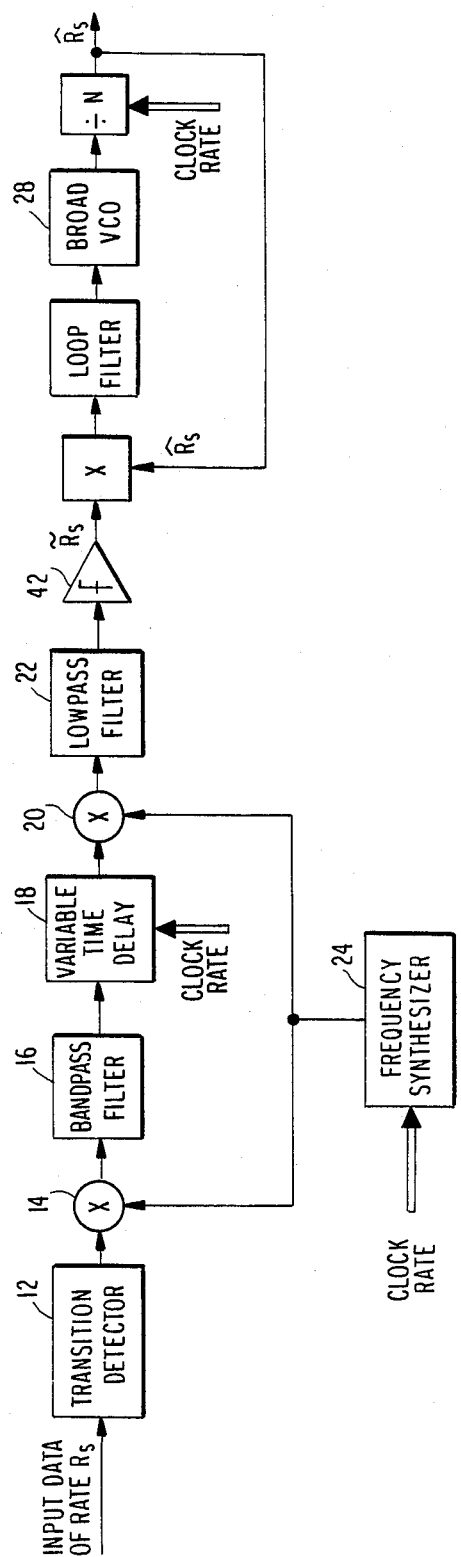
FIG. 2 illustrates the Olevsky variable rate clock recovery circuit.

In FIG. 4 elements common to FIGS. 1 and 3 are labelled with like reference numerals. The input signal, i(t), is an analog baseband representation of the data sequence A/D converted in A/D converter 149. The baseband signal is filtered by the filter 110. It is also delayed by the delay circuit 150 to produce the signal, I(t+T). The output from the filter 110 is sampled by the comparator 114 which receives the recovered symbol clock at the selected rate, $R_s$, for determining the sampling period. The output from the comparator 114 is a good estimate, Î(t), of the received data sequence.

The symbol clock is recovered by multiplying the delayed baseband data signal with the time derivative of the bit stream, Î(t), to produce an error signal representing the timing difference between the output of the VCO 218 and the incoming data rate. The time derivative of the bit stream, Î(t), is produced by the differentiation circuit 202 and the error signal by the mixer 200.

Unlike the conventional arrangement for accommodating variable bit rates, the clock synchronizing loop of the invention employs a crystal VCO 218 whose output phase jitter is much better than that of the broad pull range VCO 118' of FIG. 3. To produce the several desired clock rates which need not be integer divisible clock rates, the invention employs a frequency synthesizer 300. Frequency syntheisizers per se are known in the art and the specific frequency syntheisizer 300 illustrated in FIG. 4 is conventional. It should be readily apparent to those skilled in the art that other frequency syntheisizers may be used with the novel recovery circuit of FIG. 4, without departing from the spirit or scope of the invention. For simplicity of explanation, the clock rate ranges are assumed to be organized in decades. It is to be understood that the invention is not limited to clock rate ranges organized in decades, and is applicable to other arrangements of clock rate ranges. In general, with a synthesizer output provided in divisions of $R_s'/n$ (where $R_s'$ is the highest desired symbol rate), the corresponding output of VCO 218 would be $R_s'$ (n+1)/n.

With the clock rate ranges organized in decades, the VCO 218 has a frequency 110% of $R_s'$ and the frequency synthesizer 300 outputs a frequency that spans from $R_s'/10$ to $R_s'$. As mentioned previously herein, $R_s'$, represents the highest desired symbol rate. As will be explained in more detail hereinafter, the frequency within the range $R_s'/10$ to $R_s'$, which will be outputted by the frequency synthesizer, is determined by programmable dividers 302 and 312 in response to the selected k-digit rate.

The output of the frequency synthesizer is applied to a mixer 304 where it is mixed with the VCO 218 output at the frequency $11R_s'/10$. The difference frequency from the mixing process thus also ranges from $R_s'/10$ to $R_s'$. The sum frequency from the mixing process is removed by a low pass filter 306. The level slicer 308, which may be a strobed threshold comparator, is employed to convert the difference frequency from the low pass filter 306 to a digital clock signal. A divider and multiplexer section 310 may be used to select a desired decade range of the selected signal within the range $R_s'/10 - R_s'$. That is, the divider portion of section 310 provides for lower decade ranges of operation, and the multiplexer operates as a swtich to choose the desired range. With the section 310, a higher rate synchronous clock can be made available for applications that require one.

The frequency synthesizer 300 illustrated in FIG. 4 includes a reference oscillator 311, programmable divider 312, mixer 314, loop filter 316, VCO 318 and programmable divider 302. The programmable dividers 302 and 312, referred to hereinbefore, are settable to any of k-digit rates by a selectable k-digit rate input as is known in the art. With the synthesizer 300 settable to k-digits, symbol timing may be recovered for any k-digit rate, not just those which are integer divisible when the frequency synthesizer is combined as taught herein with a crystal VCO.

There has been described a unique variable rate symbol timing recovery technique and implementing apparatus. This technique uses a frequency synthesizer to synthesize the symbol rate of variable rate data in combination with a narrow pull range VCO, such as a crystal VCO. The arrangement herein described overcomes the significant disadvantages experienced by prior art variable rate symbol (clock) recovery circuits. The variable rate symbol timing recovery technique of the present invention is less complex than conventional variable rate symbol timing recovery methods, and its implementing apparatus produces an output clock with better phase jitter and does not require a variable time delay to compensate for changed data rates, as the circuit arrangement of the invention automatically centers on the data transitions.

It will be understood by those skilled in the art that while the invention has been described with respect to a preferred embodiment, it is not intended to be so limited. Various modifications will be apparent to those skilled in the art, which modifications are intended to be within the scope of the appended claims.

What is claimed is:

1. A symbol timing recovery circuit for variable rate data signals comprising:

means for producing an estimate of a data signal;

first mixing means for mixing a signal representative of the data signals and a signal representative of the estimate of the data signals to produce an error signal representing the difference between the data signal rate and the output of a voltage controlled oscillator;

a voltage controlled oscillator responsive to said error signal;

a frequency synthesizer for producing selected ones of a plurality of timing signals within a range of frequencies corresponding to the frequency range of the variable rate data signals; and second mixing means for mixing the output from the voltage controlled oscillator and the selected timing signal from the frequency synthesizer to produce a signal at the rate of the data signal as the recovered clock.

2. A symbol timing recovery circuit for variable rate data signals as claimed in claim 1, further including a low pass filter to eliminate from the output of said second mixing means signals other than those at the rate of said data signals.

3. A symbol timing recovery circuit for variable rate data signals as claimed in claim 2 wherein said frequency synthesizer is programmable in divisions $R_s'/n$, where $R_s'$ is the highest expected data rate and n is a clock rate range, and said voltage controlled oscillator has a frequency $(n+1)/n$ of $R_s'$.

4. A symbol timing recovery circuit for variable rate data signals as claimed in claim 3 further including a frequency divider network for selectively frequency dividing the output from said low pass filter.

5. A symbol timing recovery circuit for variable rate data signals as claimed in claim 1 wherein said voltage controlled oscillator is a narrow pull range voltage controlled oscillator.

6. A symbol timing recovery circuit for variable rate data signals as claimed in claim 5 wherein said voltage controlled oscillator is a crystal oscillator.

7. A symbol timing recovery circuit for variable rate data signal comprising:

means for producing an estimate of a data signal, said estimate producing means being responsive to a reproduced clock signal of the data signal;

a narrow pull range voltage controlled oscillator generating a reproduced clock signal at the rate $(n+1)/n)R_s'$ where $R_s'$ is the highest data rate of said variable rate data signals;

error signal means for producing an error signal representing a difference between an input data signal and its estimate, said error signal controlling said voltage controlled oscillator;

frequency synthesizer means selectively generating frequencies within the range $R_s'/n$ to $R_s'$, where n is a clock rate range; and means coupled to the outputs of said voltage controlled oscillator and said frequency synthesizer for reproducing the clock signal of the data signal.

* * * * *